M. M. Robbins,
Land Roller.
No. 108,056.  Patented Oct. 4, 1870.
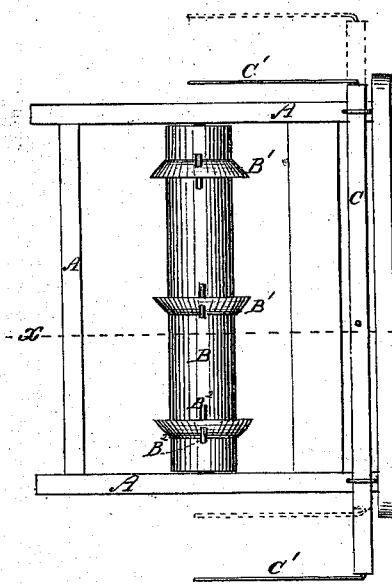
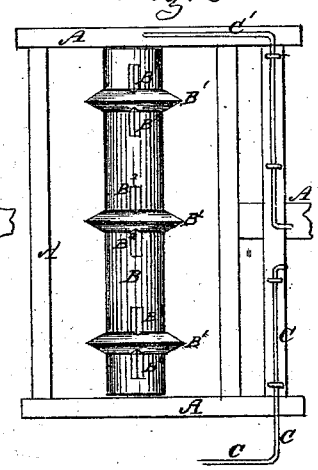
Attest
A. Ruppert
C. F. Clausen
M. M. Robbins.
Inventor
D. P. Holloway & Co
Attys

UNITED STATES PATENT OFFICE.

MOSES M. ROBBINS, OF CENTREVILLE, INDIANA.

IMPROVEMENT IN FIELD-ROLLERS AND FURROWING-MACHINES.

Specification forming part of Letters Patent No. 108,056, dated October 4, 1870.

*To all whom it may concern:*

Be it known that I, MOSES M. ROBBINS, of Centreville, in the county of Wayne and State of Indiana, have invented certain Improvements in Rolling and Marking Machines; and I do hereby declare that the following is a full, clear, and exact description thereof, reference being had to the annexed drawings, making part of this specification, in which—

Figure 1 is a plan view of my improved machine, showing the frame in which the roller and marker revolves, one form of the markers, and a slide for marking the track for the inside marker upon its return trip. Fig. 2 is also a plan view, showing the roller as provided with markers of different form and rods for use in place of the sliding bar shown in Fig. 1. Fig. 3 is a sectional elevation on line $x\ x$ of Fig. 1.

Corresponding letters refer to corresponding parts in the several figures.

This invention relates to a machine or contrivance for rolling and marking ground to be planted; and it consists in the combination and arrangement of its parts, as will be more fully set forth hereinafter.

A in the drawings refers to the frame of the machine, which may be of such proportions as to receive a roller of any desired length and diameter, its general outline being substantially such as is shown in the drawings, it being supplied with a nape or tongue, A', to which to gear the horses or other animals which draw the machine.

B refers to a roller, which should be of wood, either solid or made of heads attached to a shaft and covered with lags, so as to give it a smooth exterior surface. When it is desirable to plant the corn in hills four feet apart in one or both directions the circumference of the roller should be eight feet, in order that two rows may be marked during each revolution; but if any other distance between the rows is preferred the circumference should be made more or less, according to circumstances. The length of this roller will be governed by circumstances. If it is desired that there should be three feet between the rows, then its length should be such that when the first marker is placed eighteen inches from that end of the roller to which it is attached, and the next one thirty-six inches from the first, and so on until the desired number are secured, the distance from the last one to the end of the roller which is opposite to the point of commencing shall be eighteen inches from the end.

B' B' refer to markers, which are best made of cast-iron, and hollow, so as not to be so heavy as to be objectionable on that account. The aperture in their centers is to be of such a diameter as to admit of them being slipped over the surface of the roller to the position which they are to occupy thereon, where they may be fixed or fastened with keys, or in any other suitable manner. These markers are designed to mark and regulate the distance between the rows of corn or other crops, while those which are placed by their sides and are marked $B^2\ B^2$ are designed to mark the places where the seeds are to be dropped, or, in other words, to regulate and mark the distances between the hills. These last-named markers consist of pieces of iron, steel, or other suitable material inserted into the roller at the sides of the circular markers, their outer ends being sharpened, so as to cause them to enter the ground easily.

By the use of the above-described roller and marker the ground is left with a smooth surface, except at the particular points where the rows and hills of the crop are to be, and thus a great saving of time is effected in covering the crop, as well as in cultivating it for the first time.

C C refer to rods of metal, which are attached to the frame of the machine, as shown in Fig. 3, or it may be a slide made of wood or iron, as shown in Fig. 1, their outer ends being bent downward, so as to rest upon the earth, when desired, and make a mark thereon, which shall serve as a guide to the operator upon his return trip, in order that the distance between all of the rows may be the same.

Having thus described my invention, what I claim, and desire to secure by Letters Patent, is—

1. The combination, in a rolling and marking machine, of two sets of markers arranged upon a roller in such a manner that by being moved in the proper direction the distances between the rows shall be marked, and at the same time the distances between the hills in the rows, substantially as described.

2. The combination of the roller B with its markers B' and B² and the side markers, C C, substantially as and for the purpose set forth.

In testimony whereof I have signed my name to this specification in the presence of two subscribing witnesses.

M. M. ROBBINS.

Witnesses:
   HENRY C. FOX,
   WM. A. PEELLE.